United States Patent
Herter et al.

(10) Patent No.: US 8,219,294 B2
(45) Date of Patent: Jul. 10, 2012

(54) METHOD FOR ACTUATING A CLUTCH OF A DRIVETRAIN

(75) Inventors: Peter Herter, Ravensburg (DE);
Joachim Staudinger, Ravensburg (DE);
Rainer Petzold, Friedrichshafen (DE);
Franz Bitzer, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 297 days.

(21) Appl. No.: 12/664,542

(22) PCT Filed: May 27, 2008

(86) PCT No.: PCT/EP2008/056449
§ 371 (c)(1),
(2), (4) Date: Dec. 14, 2009

(87) PCT Pub. No.: WO2009/003768
PCT Pub. Date: Jan. 8, 2009

(65) Prior Publication Data
US 2010/0185372 A1    Jul. 22, 2010

(30) Foreign Application Priority Data
Jun. 30, 2007 (DE) .......................... 10 2007 030 490

(51) Int. Cl.
G06F 7/00 (2006.01)
G06F 17/00 (2006.01)
G06F 19/00 (2006.01)
(52) U.S. Cl. ........................................................ 701/67
(58) Field of Classification Search .................. None
See application file for complete search history.

(56) References Cited

U.S. PATENT DOCUMENTS

| | | | | |
|---|---|---|---|---|
| 4,200,175 A | * | 4/1980 | Dick | 477/175 |
| 4,793,454 A | * | 12/1988 | Petzold et al. | 477/39 |
| 4,799,160 A | | 1/1989 | Arbeille et al. | |
| 4,825,366 A | * | 4/1989 | Yamamoto et al. | 701/67 |
| 4,858,131 A | * | 8/1989 | Sugimura et al. | 701/68 |
| 4,899,858 A | * | 2/1990 | Cote et al. | 477/83 |
| 4,971,183 A | | 11/1990 | Tellert | |
| 5,314,050 A | * | 5/1994 | Slicker et al. | 477/171 |
| 5,439,428 A | * | 8/1995 | Slicker | 477/175 |
| 5,489,012 A | * | 2/1996 | Buckley et al. | 192/3.63 |
| 5,813,942 A | * | 9/1998 | Nakagawa et al. | 477/120 |
| 6,059,690 A | * | 5/2000 | Tanizawa et al. | 477/169 |
| 6,502,027 B2 | * | 12/2002 | Saotome et al. | 701/67 |
| 6,533,704 B2 | * | 3/2003 | Saito et al. | 477/92 |

(Continued)

FOREIGN PATENT DOCUMENTS
DE         37 37 899 A1    8/1989
(Continued)

Primary Examiner — Khoi Tran
Assistant Examiner — Bhavesh V Amin
(74) Attorney, Agent, or Firm — Davis & Bujold, P.L.L.C.

(57) ABSTRACT

A method for actuating a clutch (6) of a drivetrain of a motor vehicle such that, when the motor vehicle is rolling downhill with the accelerator pedal not being actuated and when the motor vehicle is coasting on level ground with the accelerator pedal not being actuated, a clutch position of the clutch (6) is determined as a function of a rotational speed difference between an input speed of a transmission (2) of the drivetrain and an idling speed of a power engine (1) of the drivetrain. The method includes the steps of determining the clutch position from the rotational speed difference between the transmission input speed and the power engine idling speed and correcting the clutch position using at least one parameter that depends on acceleration of the motor vehicle.

11 Claims, 1 Drawing Sheet

U.S. PATENT DOCUMENTS

| | | | |
|---|---|---|---|
| 6,641,505 B2 * | 11/2003 | Sayman et al. | 477/177 |
| 6,676,561 B2 | 1/2004 | Fritzer et al. | |
| 7,510,502 B2 | 3/2009 | Bothe et al. | |
| 7,813,858 B2 * | 10/2010 | Praus et al. | 701/68 |
| 2001/0005805 A1 * | 6/2001 | Saotome et al. | 701/67 |
| 2003/0134713 A1 | 7/2003 | Senger et al. | |
| 2005/0221958 A1 | 10/2005 | Lee et al. | |
| 2008/0227593 A1 | 9/2008 | Bartels et al. | |

FOREIGN PATENT DOCUMENTS

| | | |
|---|---|---|
| DE | 100 25 882 A1 | 12/2000 |
| DE | 199 42 715 A1 | 3/2001 |
| DE | 10 2004 007 160 A1 | 8/2005 |
| EP | 0 183 094 A1 | 6/1986 |
| EP | 1 584 832 A1 | 10/2005 |
| WO | 2007/014636 A1 | 2/2007 |

* cited by examiner

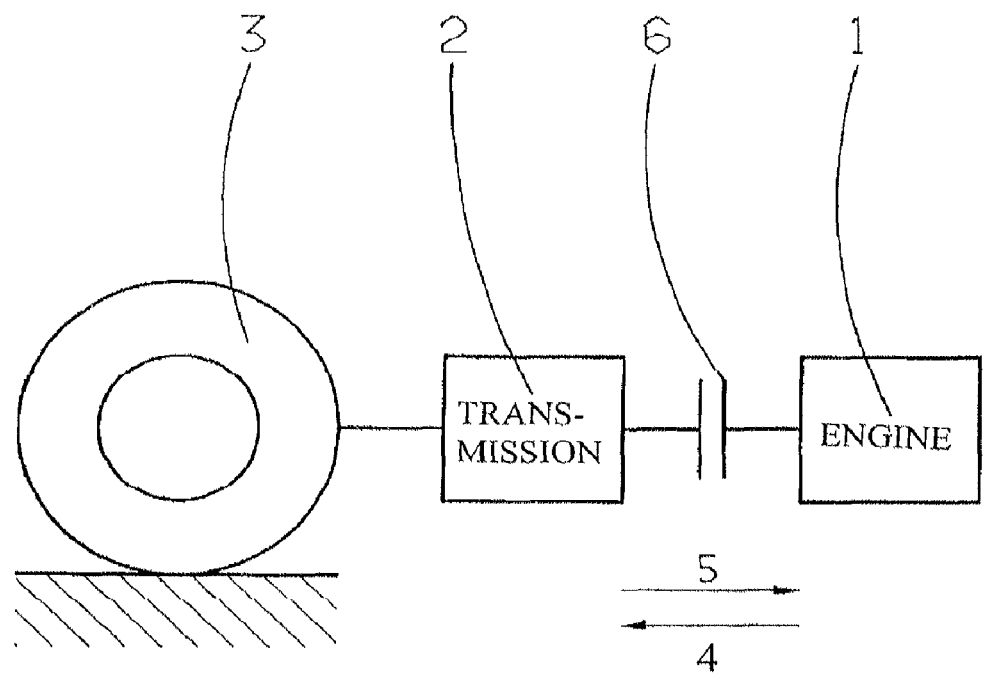

METHOD FOR ACTUATING A CLUTCH OF A DRIVETRAIN

This application is a National Stage completion of PCT/EP2008/056449 filed May 27, 2008, which claims priority from German patent application serial no. 10 2007 030 490.2 filed Jun. 30, 2007.

FIELD OF THE INVENTION

The invention concerns a method for actuating a clutch of a drivetrain of a motor vehicle.

BACKGROUND OF THE INVENTION

Besides a power engine and a transmission, the drivetrain of a motor vehicle has a clutch positioned between the power engine and the transmission so that when the clutch is disengaged, the power engine is decoupled from the transmission and when the clutch is engaged, the power engine is coupled to the transmission. The present invention concerns a method for the automatic actuation of a clutch of a drivetrain, in which the transmission of the drivetrain is an automatic transmission and the clutch is an automatically actuated clutch.

When a motor vehicle is rolling down a slope with the accelerator pedal not actuated, the clutch should be engaged so far as possible such that the braking effect of the power engine can act upon the motor vehicle. Moreover, when rolling downhill with the clutch engaged a so-termed throttle cut-off of the power engine can be activated, whereby fuel can be saved. In contrast, when the motor vehicle is coasting on level ground with the accelerator pedal not activated, the clutch should be disengaged so far as possible so that the motor vehicle can continue coasting. Accordingly, a method for actuating a clutch of a drivetrain when the accelerator pedal is unactuated must cover the situations when the motor vehicle is rolling downhill and the clutch has to absorb the traction torque of the power engine and must therefore not separate, and when the motor vehicle is coasting, the clutch must separate far enough to allow coasting without so-termed drag.

In practice the clutch position of the drivetrain's clutch is determined as a function of a rotation speed difference between a transmission input speed and an idling speed of the power engine. Particularly when the speed difference is very small, i.e. when the transmission output speed is about the same as the power engine's idling speed, the determination of an appropriate clutch position on the basis of the rotation speed difference presents difficulties. This can result is the clutch being engaged and disengageded several times one after another, which clearly has an adverse effect on comfort.

SUMMARY OF THE INVENTION

Starting from this situation, the present invention addresses the problem of providing a new method for actuating the clutch of a drivetrain.

In accordance with a first aspect of the invention, the clutch position determined from the rotational speed difference between the transmission input speed and the idling speed of the power engine is corrected using at least one parameter which is a function of acceleration of the motor vehicle.

In accordance with a second aspect of the invention, the rotational speed difference is determined from a transmission input speed determined by computation and a power engine's idling speed determined by measurement means.

In accordance with a third aspect of the invention, the clutch position is determined as a function of the rotational speed difference between the transmission input speed and the power engine's idling speed, and as a function of drivetrain torque or a quantity of fuel supplied to the power engine.

With the above aspects of the present invention, which can be applied either alone or in any desired combination with one another, a clutch position for the cases when a motor vehicle is rolling downhill with the accelerator pedal unactuated and when the vehicle is coasting on level ground, again with the accelerator pedal unactuated, can be determined substantially better than is possible by the procedure known from the prior art. In particular, a succession of clutch disengagements and engagements that affects comfort adversely can be avoided.

BRIEF DESCRIPTION OF THE DRAWING

Example embodiments of the invention, to which it is not limited, are explained in more detail with reference to the drawing, which shows:

FIG. 1: Diagrammatic representation of a power engine of a motor vehicle

DETAILED DESCRIPTION OF THE PREFERRED EMBODIMENTS

FIG. 1 shows a greatly simplified layout of a drivetrain of a motor vehicle, the drivetrain comprising a power engine 1, and automatic transmission 2 and driven wheels 3 of the motor vehicle. The automatic transmission 2 transmits a traction force from the power engine 1 to the wheels 3 of the motor vehicle. When the drivetrain of FIG. 1 is operated in the traction mode, power flow is directed as shown by the arrow 4, from the power engine 1 toward the wheels 3 of the motor vehicle. On the other hand, when the drivetrain is operating in the thrust mode, as for example while braking or coasting, then the power flow is directed as shown by the arrow 5 from the wheels 3 toward the power engine 1. An automatically actuated clutch 6 is arranged between the automatic transmission 2 and the power engine 1.

The present invention concerns a method for actuating the automatically actuated clutch 6 of the drivetrain, namely for determining a clutch position of the clutch 6 with which greater shifting comfort can be ensured, on the one hand when the motor vehicle is rolling downhill with its accelerator pedal unactuated, and on the other hand when the motor vehicle is coasting on level ground with the accelerator pedal unactuated.

The clutch position of the clutch 6 required for covering the driving situations of rolling downhill and coasting, in each case with the accelerator pedal not actuated, is determined as a function of a rotational speed difference between an input rotational speed of the automatic transmission 2 and an idling rotational speed of the power engine 1. In what follows, the input rotational speed of the automatic transmission 2 will be called the transmission input speed and the idling rotational speed of the power engine 1 will be called the power engine's idling speed.

In accordance with a first aspect of the present invention, the clutch position is determined as a function of a rotational speed difference determined from a measured transmission input speed and a measured power engine idling speed, and the clutch position determined as a function of the speed difference is corrected using at least one parameter that is a function of acceleration of the motor vehicle.

The clutch position determined from the speed difference between the measured transmission input speed and the measured power engine idling speed is corrected in such a manner that when farther disengagment of the clutch 6 is required on the basis of the speed difference that depends on the transmission input speed, then if the motor vehicle is undergoing positive acceleration the farther disengagement of the clutch 6 is suppressed or the clutch position is corrected in the direction of engaging the clutch farther.

On the other hand, if farther engagement of the clutch 6 is required on the basis of the speed difference that depends on the transmission input speed, then if the motor vehicle is undergoing a negative acceleration the farther engagement of the clutch 6 is suppressed or the clutch position is corrected in the direction of disengagment the clutch farther.

This correction of the clutch position with the help of the parameter or all the parameters can take place in such manner that the clutch position is corrected by multiplication by a factor that is a function of the motor vehicle's acceleration and/or additively with an offset that is a function of the motor vehicle's acceleration.

The invention takes into account the recognition that the measured transmission input speed is a fluctuating magnitude. By virtue of the invention, despite the fact that the transmission input speed fluctuates, the clutch position can be stabilized so that the shifting comfort is increased.

In addition or alternatively to the above first aspect of the present invention, in accordance with a second aspect of the invention the clutch position is determined as a function of the rotational speed difference in such manner that as the speed difference, a difference between a transmission input speed determined by computation and the power engine idling speed determined by measurement is used. Preferably, the transmission input speed is determined by computation from a transmission output speed determined by measurement or from a wheel speed of the motor vehicle determined by measurement. Such determination of the transmission input speed by computation tends to be not so prone to fluctuation as a transmission input speed determined by measurement, so in this way too the clutch position can be stabilized and the shifting comfort increased.

In addition or alternatively to the first aspect and/or the second aspect of the present invention, in accordance with a third aspect of the invention the clutch position can be determined on the one hand as a function of the rotational speed difference between the transmission input speed and the power engine idling speed, and on the other hand as a function of a drivetrain torque or of a fuel quantity supplied to the power engine 1. The quantity of fuel supplied to the power engine 1, also called the fuel injection quantity, is proportional to the drivetrain torque.

In accordance with this third aspect, the procedure adopted is preferably such that if the fuel quantity supplied to the power engine is smaller that a limit value, or if there is a torque flow from the motor vehicle toward the power engine 1, i.e. if a thrust torque exists, then the farther disengagement of the clutch 6 is suppressed or the clutch position is corrected in the direction of farther engaging of the clutch 6. On the other hand, if the quantity of fuel supplied to the power engine 1 is larger than a limit value or if there is a torque flow from the power engine 1 to the motor vehicle, i.e. a traction torque, then the farther engagement of the clutch 6 is suppressed or the clutch position is corrected in the direction of farther disengagement. For this, the drivetrain torque can be determined either at the power engine 1 or at the transmission input or the transmission output.

INDEXES

1 Power engine
2 Automatic transmission
3 Wheel
4 Arrow
5 Arrow
6 Clutch

The invention claimed is:

1. A method for actuating a clutch (6) of a drivetrain of a motor vehicle such that, when one of the motor vehicle is rolling downhill with an accelerator pedal not being actuated and when the motor vehicle is coasting on level ground with the accelerator pedal not being actuated, a clutch position of the clutch (6) being determined as a function of a rotational speed difference between an input speed of a transmission (2) of the drivetrain and an idling speed of a power engine (1) of the drivetrain, the method comprising the steps of:

initiating determination the clutch position of the clutch (6) when the motor vehicle is either rolling downhill or coasting on level ground while the accelerator pedal is unactuated;

determining via a processor the rotational speed difference between the transmission input speed and the power engine idling speed;

determining the clutch position from the rotational speed difference between the transmission input speed and the power engine idling speed, and correcting the clutch position in either an engaging direction or a disengaging direction depending on at least one parameter that depends on acceleration of the motor vehicle.

2. The method according to claim 1, further comprising the steps of correcting the clutch position, determined from the rotational speed difference between the transmission input speed and the power engine idling speed, such that when a farther disengagement of the clutch (6) is called for, on a basis of a speed difference that depends on the transmission input speed, then if the motor vehicle is undergoing a positive acceleration, one of suppressing the farther disengagement of the clutch (6) or correcting the clutch position in the direction of farther engaging of the clutch.

3. The method according to claim 1, further comprising the steps of correcting the clutch position, determined from the rotational speed difference between the transmission input speed and the power engine idling speed, such that when a farther engagement of the clutch (6) is called for, on a basis of a speed difference that depends on the transmission input speed, then if the motor vehicle is undergoing a negative acceleration, one of suppressing the farther disengagement of the clutch (6) and correcting the clutch position in the direction of farther disengaging of the clutch.

4. The method according to claim 1, further comprising the step of correcting the clutch position by multiplication by a factor that is a function of the acceleration of the motor vehicle.

5. The method according to claim 1, further comprising the step of additively correcting the clutch position using an offset that is a function of the acceleration of the motor vehicle.

6. A method for actuating a clutch (6) of a drivetrain of a motor vehicle such that, when one of the motor vehicle is rolling downhill with an accelerator pedal not actuated and when the motor vehicle is coasting on level ground with the accelerator pedal not actuated, a clutch position of the clutch (6) is determined as a function of a rotational speed difference between an input speed of a transmission (2) of the drivetrain and an idling speed of a power engine (1) of the drivetrain, the method comprising the step of:

initiating determination the clutch position of the clutch (6) when the motor vehicle is either rolling downhill or coasting on level ground while the accelerator pedal is unactuated;

measuring the power engine idling speed;

computing the transmission input speed;

determining via a processor the rotational speed difference between the transmission input speed and the power engine idling speed;

determining the clutch position from the rotational speed difference between the transmission input speed and the power engine idling speed, and correcting the clutch position in either an engaging direction or a disengaging direction depending on at least one parameter that depends on acceleration of the motor vehicle.

7. The method according to claim 6, further comprising the steps of measuring at least one of a transmission output speed and a wheel speed;

computing the transmission input speed from either the measured transmission output speed or the measured wheel speed.

8. A method for actuating a clutch (6) of a drivetrain of a motor vehicle such that, when one of the motor vehicle is rolling downhill with an accelerator pedal not actuated and when the motor vehicle is coasting on level ground with the accelerator pedal not actuated, a clutch position of the clutch (6) is determined as a function of a rotational speed difference between an input speed of a transmission (2) of the drivetrain and an idling speed of a power engine (1) of the drivetrain, the method comprising the steps of:

initiating determination the clutch position of the clutch (6) when the motor vehicle is either rolling downhill or coasting on level ground while the accelerator pedal is unactuated;

determining the power engine idling speed;

determining the transmission input speed;

determining via a processor the rotational speed difference between the transmission input speed and the power engine idling speed;

determining the clutch position as a function of the rotational speed difference between the transmission input speed and the power engine idling speed and as a function of either a drivetrain torque or a quantity of fuel supplied to the power engine (1).

9. The method according to claim 8, further comprising the step of suppressing farther disengagement of the clutch (6) or correcting the clutch position in a direction of farther engagement either when the quantity of fuel supplied to the power engine (1) is smaller than a limit value or when there is a torque flow in the drivetrain from wheels of the motor vehicle toward the power engine (1).

10. The method according to claim 8, further comprising the steps of suppressing farther engagement of the clutch (6) or correcting the clutch position in a direction of farther disengagement when the quantity of fuel supplied to the power engine (1) is larger than a limit value or when there is a torque flow from the power engine toward the motor vehicle.

11. The method according to claim 1 further comprising the steps of:

determining the rotational speed difference from the transmission input speed determined by computation and the power engine idling speed determined by measurement; and determining the clutch position as a function of the rotational speed difference between the transmission input speed and the power engine idling speed and as a function of a drivetrain torque or a quantity of fuel supplied to the power engine (1).

\* \* \* \* \*